United States Patent
Yoon et al.

(10) Patent No.: US 11,918,903 B2
(45) Date of Patent: Mar. 5, 2024

(54) APPARATUS, METHOD, AND COMPUTER-READABLE RECORDING MEDIUM FOR ENHANCING MEMORY

(71) Applicant: Neurospace Inc., Daegu (KR)

(72) Inventors: Eun Young Yoon, Daegu (KR); Il Han Yun, Daegu (KR)

(73) Assignee: NEUROSPACE INC., Daegu (KR)

( * ) Notice: Subject to any disclaimer, the term of this patent is extended or adjusted under 35 U.S.C. 154(b) by 307 days.

(21) Appl. No.: 17/404,971

(22) Filed: Aug. 17, 2021

(65) Prior Publication Data
US 2021/0370173 A1   Dec. 2, 2021

Related U.S. Application Data

(63) Continuation of application No. PCT/KR2019/013720, filed on Oct. 18, 2019.

(30) Foreign Application Priority Data

Feb. 18, 2019  (KR) .................. 10-2019-0018683
Apr. 19, 2019  (KR) .................. 10-2019-0045799
May 15, 2019  (JP) ....................... 2019-091792

(51) Int. Cl.
*A63F 13/537* (2014.01)
*A63F 13/86* (2014.01)

(52) U.S. Cl.
CPC ............ *A63F 13/537* (2014.09); *A63F 13/86* (2014.09)

(58) Field of Classification Search
CPC ................................ A63F 13/537; A63F 13/86
(Continued)

(56) References Cited

U.S. PATENT DOCUMENTS 4,114,877 A * 9/1978 Goldfarb .................. A63F 9/06
                                                         273/157 R
5,855,513 A * 1/1999 Lam .................... A63F 3/00643
                                                         273/237
(Continued)

FOREIGN PATENT DOCUMENTS

JP    2001-218770 A    8/2001
JP    2017-182173 A   10/2017
(Continued)

OTHER PUBLICATIONS

International Search Report dated Jan. 30, 2020 for corresponding the international application No. PCT/KR2019/013720, cited above references.

*Primary Examiner* — Allen Chan
(74) *Attorney, Agent, or Firm* — Hauptman Ham, LLP

(57) ABSTRACT

A plurality of first icons representing activity and a plurality of second icons representing satisfaction for the activity are stored in a memory. A user selects at least one first icon and at least one second icon. The selected first icon and the selected second icon are stored in the memory. A plurality of third icons including the selected first icon and a plurality of fourth icons including the selected second icon are displayed and the user selects a least one first icon and at least one second icon selected before in order from the plurality of third icons and the plurality of fourth icons, respectively. The at least one first icon and the at least one second icon currently selected are compared with the at least one first icon and the at least one second icon stored in the memory to calculate a memory score of the user.

12 Claims, 14 Drawing Sheets

(58) Field of Classification Search
USPC .......................................................... 463/31
See application file for complete search history.

(56) References Cited

U.S. PATENT DOCUMENTS

| | | | | |
|---|---|---|---|---|
| 6,588,756 | B1 * | 7/2003 | Hughes | ..................... A63F 1/04 |
| | | | | 273/299 |
| 6,641,402 | B2 * | 11/2003 | Boggs | ..................... G09B 5/00 |
| | | | | 273/273 |
| 7,631,872 | B2 * | 12/2009 | Roemer | ............. G07F 17/3295 |
| | | | | 273/273 |
| 2012/0021811 | A1 * | 1/2012 | Weidetz | ................... A63H 5/00 |
| | | | | 463/9 |

FOREIGN PATENT DOCUMENTS

| KR | 10-0532225 B1 | 12/2005 |
|---|---|---|
| KR | 10-2013-0010584 A | 1/2013 |
| KR | 10-1244818 B1 | 3/2013 |
| KR | 10-2018-0034277 A | 4/2018 |

* cited by examiner

APPARATUS, METHOD, AND COMPUTER-READABLE RECORDING MEDIUM FOR ENHANCING MEMORY

CROSS-REFERENCE TO RELATED APPLICATIONS

This application is a continuation of International Application No. PCT/KR2019/013720, filed Oct. 18, 2019, which is based upon and claims the benefit of priority from Korean Patent Application No. 10-2019-0018683, filed Feb. 18, 2019, Korean Patent Application No. 10-2019-0045799, filed Apr. 19, 2019, which is now Korean Patent No. 10-2122545, and Japanese Patent Application No. 2019-091792, filed May 15, 2019, which is now Japanese Patent No. 6561361, the contents of which are incorporated herein by reference in their entirety.

BACKGROUND

1. Field

The present invention relates to an apparatus, a method, and a computer-readable recording medium for enhancing memory.

2. Description of the Related Art

In modern society that is characterized in digital culture and smartphone, human beings tend to experience degrading memory performance as they rely more and more to memorize on electronic devices. Therefore, it is necessary to start from early in childhood to try not only to slow down the decline of memory due to aging, but also to proceed to improvement of the memory.

Korean Patent Laid-Open Publication No. 10-2013-0010584 discloses a memory improvement training method of evaluating a user's memory capacity, determining a training phase based on an evaluated memory capacity, and providing the user with a memory training program corresponding to the determined training phase.

According to the theory of cognitive neuroscience, frequent memory retrieval processes lead to improved memory. Bringing out past experiences leads to future imagination, problem solving, and creativity, and humans better remember the autobiographical memory associated with them.

In addition, successful autobiographical memory recall contributes to the activation of the hippocampus, and it helps to prevent memory distortion by drawing out the experience of one's own.

SUMMARY

According to some embodiments of the present invention, an apparatus for enhancing memory comprises a processor including a login screen providing unit configured to provide a login screen, an icon storing unit configured to store a plurality of first icons each representing an activity and a plurality of second icons each representing a degree of satisfaction for the activity in a memory, an input screen providing unit configured to provide an input screen for allowing a user after logging in through the login screen to select at least one first icon from the plurality of first icons and at least one second icon corresponding to the at least one first icon from the plurality of second icons, a selected-icon storing unit configured to, upon the user selecting the at least one first icon and the at least one second icon through the input screen, store the at least one first icon and the at least one second icon in the memory, an activity retrieval test screen providing unit configured to, upon the user logging in through the login screen next day or later of a day when the user selected the at least one first icon and the at least one second icon through the input screen, provide an activity retrieval test screen to display a plurality of third icons including the at least one first icon selected through the input screen and a plurality of fourth icons including the at least one second icon selected through the input screen and to prompt the user to select the at least one first icon and the at least one second icon selected through the input screen in order from the plurality of third icons and the plurality of fourth icons, respectively, a memory score calculating unit configured to, upon the user selecting the at least one first icon and the at least one second icon from the plurality of third icons and the plurality of fourth icons, respectively, through the activity retrieval test screen, compare the at least one first icon and the at least one second icon that are currently selected with the at least one first icon and the at least one second icon stored in the memory by the selected-icon storing unit and to calculate a memory score of the user based on a result of comparison, and a feedback screen providing unit configured to provide a feedback screen for displaying the memory score calculated by the memory score calculating unit.

Further, according to some embodiments of the present invention, a method of enhancing memory by a processor comprises providing a login screen, storing a plurality of first icons each representing an activity and a plurality of second icons each representing a degree of satisfaction for the activity in a memory, providing an input screen for allowing a user after logging in through the login screen to select at least one first icon from the plurality of first icons and at least one second icon corresponding to the at least one first icon from the plurality of second icons, storing, upon the user selecting the at least one first icon and the at least one second icon through the input screen, the at least one first icon and the at least one second icon in the memory, providing, upon the user logging in through the login screen next day or later of a day when the user selected the at least one first icon and the at least one second icon through the input screen, an activity retrieval test screen to display a plurality of third icons including the at least one first icon selected through the input screen and a plurality of fourth icons including the at least one second icon selected through the input screen and to prompt the user to select the at least one first icon and the at least one second icon selected through the input screen in order from the plurality of third icons and the plurality of fourth icons, respectively, comparing, upon the user selecting the at least one first icon and the at least one second icon from the plurality of third icons and the plurality of fourth icons, respectively, through the activity retrieval test screen, the at least one first icon and the at least one second icon that are currently selected with the at least one first icon and the at least one second icon stored in the memory, calculating a memory score of the user based on a result of comparison, and providing a feedback screen for displaying the memory score calculated at the calculating.

Moreover, according to some embodiments of the present invention, a non-transitory computer readable medium stores a computer program including computer-executable instructions for causing, when executed in a processor, the processor to perform the method according to some embodiments of the present invention.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE SOME EMBODIMENTS

Exemplary embodiments of the present invention are described in detail below with reference to the accompanying drawings.

It is an object of the present invention to provide an apparatus for enhancing memory performance through autobiographical memory recall.

Further, it is another object of the present invention to provide an apparatus for enhancing memory capable of improving metacognition and memory through testing, feedback, and retry.

The challenges to be addressed by the present invention are not limited to those mentioned above, and other unmentioned problems can be clearly understood by those skilled in the art from the following description.

Figure 1:
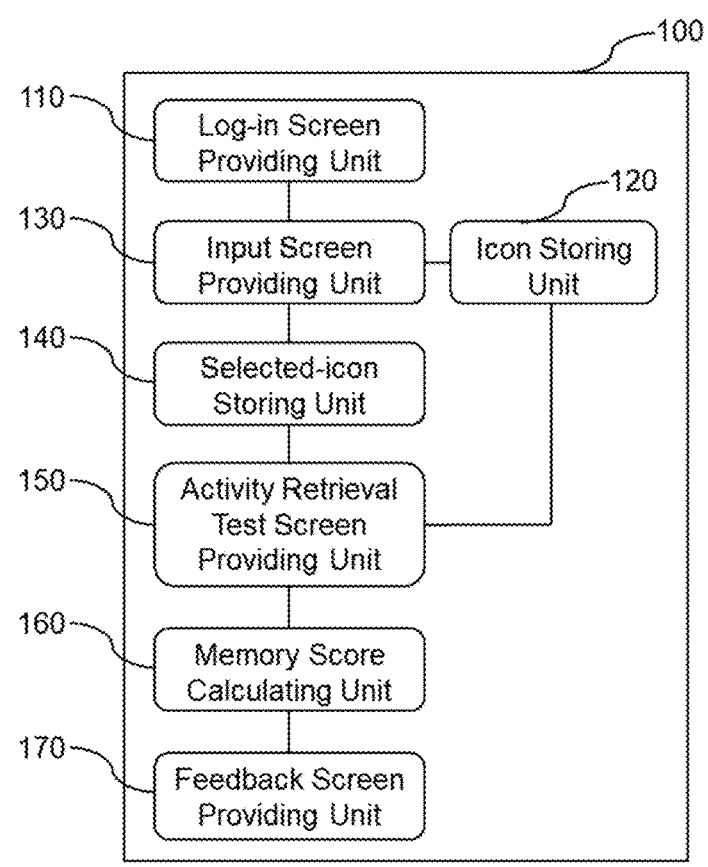
FIG. 1 is a functional block diagram of an apparatus for enhancing memory according to some embodiments of the present invention.

FIG. 1 is a functional block diagram of an apparatus 100 for enhancing memory according to some embodiments of the present invention.

As shown FIG. 1, the apparatus 100 according to some embodiments of the present invention includes a login screen providing unit 110, an icon storing unit 120, an input screen providing unit 130, a selected-icon storing unit 140, an activity retrieval test screen providing unit 150, a memory score calculating unit 160, and a feedback screen providing unit 170.

The apparatus 100 is provided as a software application (or "app" e.g., within a smartphone) through modules that perform the functions of the above respective units within a processor (CPU), wherein the login screen providing unit 110 provides a login screen for a user to logging in the same app.

The icon storing unit 120 stores a plurality of first icons and a plurality of second icons in advance. In some embodiments of the present invention, the first icons are those representing such activities as meeting, sports, movie viewing, business, etc., and the second icons are those indicate satisfactions, achievements, or feelings (hereinafter commonly referred to as satisfaction) for the respective activities.

In some embodiments of the present invention, the first icons and the second icons include at least one of generic icons, emoticons, and images.

Using images for the first and second icons may be more helpful for a user with memory deficit to retrieve the correct memory from the damaged memory.

The input screen providing unit 130 provides an input screen for allowing the user after logged in through the login screen to make a selection 132 of at least one first icon among the plurality of first icons stored the icon storing unit 120, and another selection 133 of at least one second icon corresponding to the first icon having been selected, from among the plurality of second icons.

In some embodiments of the present invention, the user selects a first icon corresponding to his/her activity, and then selects a satisfaction level with that activity, for example, from five stepwise levels. The satisfaction levels are not limited to five steps but may be set to less or more as needed.

The selected-icon storing unit 140 is responsive to when the user makes the selections of the first and second icons through the input screen for storing the selected first and second icons. At this time, the user may input a simple memo along with the selections of the first and second icons, and the selected-icon storing unit 140 stores the memo inputted together with the selected first and second icons at the time of inputting the memo.

In some embodiments of the present invention, instead of or together with the memo, images (photos) may be saved. Considering the contemporary sensitivity of people, using an image taken by the user directly or an image related to each activity may be more effective than using a text-based memo.

The activity retrieval test screen providing unit 150 may be responsive to the user's logging in through the login screen one or more days later than the previous selection of the first and second icons through the input screen, for providing a display of multiple icons that include the first icons and multiple icons that include the second icons, thereby providing an activity retrieval test screen for administering the activity retrieval test which prompts the user to select, from among the displayed multiple icons, the first and second icons following that same order as in the previous selection thereof made through the input screen one or more days earlier.

In some embodiments of the present invention, the one or more days of intermission from the previous selection of the first and second icons before carrying out the subsequent selection thereof allows the user to have the time for solidifying the memory through sleeping on it.

In this case, where it was before 12:00 when the user selected the first and second icons through the input screen, the activity retrieval test screen is displayed when the user logs in again on the next day after 4:00 am, for example. The key here is to take a sleep for a predetermined time (e.g., at least four hours) after selecting the first and second icons through the input screen, so the icon selection of the day is considered to encompass the next day's selection session if the earlier selection includes a predetermined time of nap, for example, a predetermined time elapsed depending on the time zone assumably involving a several hours sleep at dawn after making the icon selection at around 1:00 am.

In other words, the next day as used in the present specification means to take a sleep for a predetermined time after selecting the first and second icons through the input screen.

The apparatus for enhancing memory according to some embodiments of the invention improves memory by activating a wide area of the brain through a kind of diary writing and a diary-based memory training program.

According to cognitive neuroscience theories, retrieving memories often leads to better memory. One method of retrieving information is testing. Checking whether one's own memories are right or wrong can even improve meta memory. The activity retrieval test according to some embodiments of the present invention is designed to test the memory of the user's experience and feelings simply and quickly.

In addition, metacognition and memory can be enhanced at the same time by feedback through rechallenge. The apparatus for enhancing memory according to some embodiments of the invention can effectively improve the memory capacity by connecting a series of contents classified by the activity contents, the order, and the emotions, and the present apparatus is systematized so that the higher the user moves up in tiers, the more advanced memory capacity the user shows.

The memory score calculating unit 160 is responsive to when the user selects through the activity retrieval test screen, the first and second icons from the plurality of icons displayed thereon, for comparing the selected first and second icons respectively with the stored first and second icons in the selected-icon storing unit 140, and thereby calculating the memory score of the user based on the comparison result.

In other words, the stored first and second icons in the selected-icon storing unit 140 are to indicate the activities performed by the user on the corresponding day and the satisfaction levels of the respective activities, while the selected first and second icons through the activity retrieval test screen are from recalling the previous selection of as well as the order of selection of the first and second icons made on the previous day or one or more days earlier, and therefore the consistency between the stored icons and the selected icons proves a good memory of the user who is then entitled to a high memory score. In concert with the next day as defined above, the previous day as used herein is not simply reckoned to 12 o'clock at midnight but includes a predetermined time before a predetermined sleep that the user had.

The feedback screen providing unit 170 provides a feedback screen for displaying the memory score calculated by the memory score calculating unit 160.

In some embodiments of the present invention, the selected-icon storing unit 140 is responsive to when the user selects multiple first icons and their corresponding multiple second icons, for storing those multiple first icons and their corresponding multiple second icons and the order of selection of the respective icons. The memory score calculating unit 160 is responsive to when the user selects through the activity retrieval test screen, the multiple first icons and their corresponding multiple second icons from the plurality of icons displayed thereon, for comparing the selected multiple first icons and their corresponding multiple second icons and the order of selection of the respective icons with the stored multiple first icons and their corresponding multiple second icons and the stored order of selection of the respective icons in the selected-icon storing unit 140, and thereby calculating the memory score of the user based on the comparison result.

Figure 2:
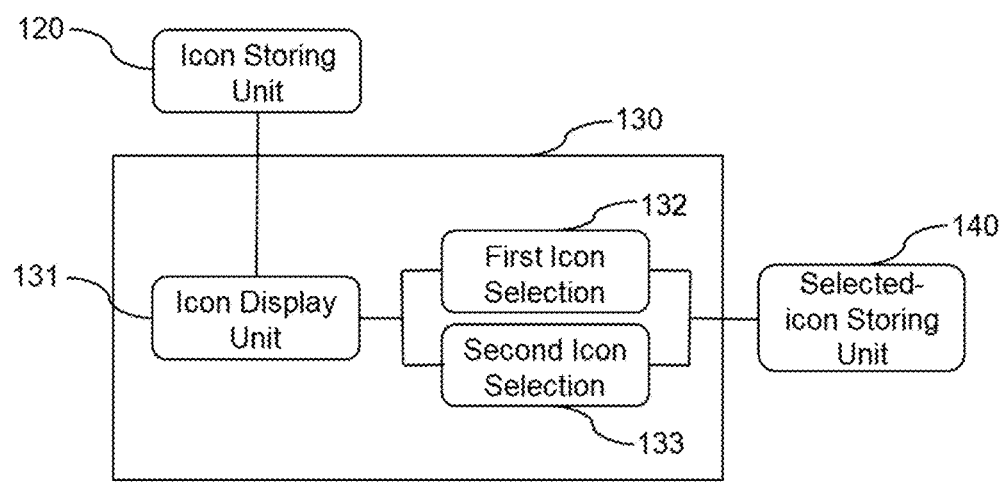
FIG. 2 is a functional block diagram of an input screen providing unit of the apparatus for enhancing memory shown in FIG. 1.

FIG. 2 is a functional block diagram of the input screen providing unit 130 according to some embodiments of the present invention.

In some embodiments of the present invention, the input screen providing unit 130 includes an icon display unit 131 for displaying at least a part of the plurality of first icons and the plurality of second icons stored in the icon storing unit 120.

Figure 3:
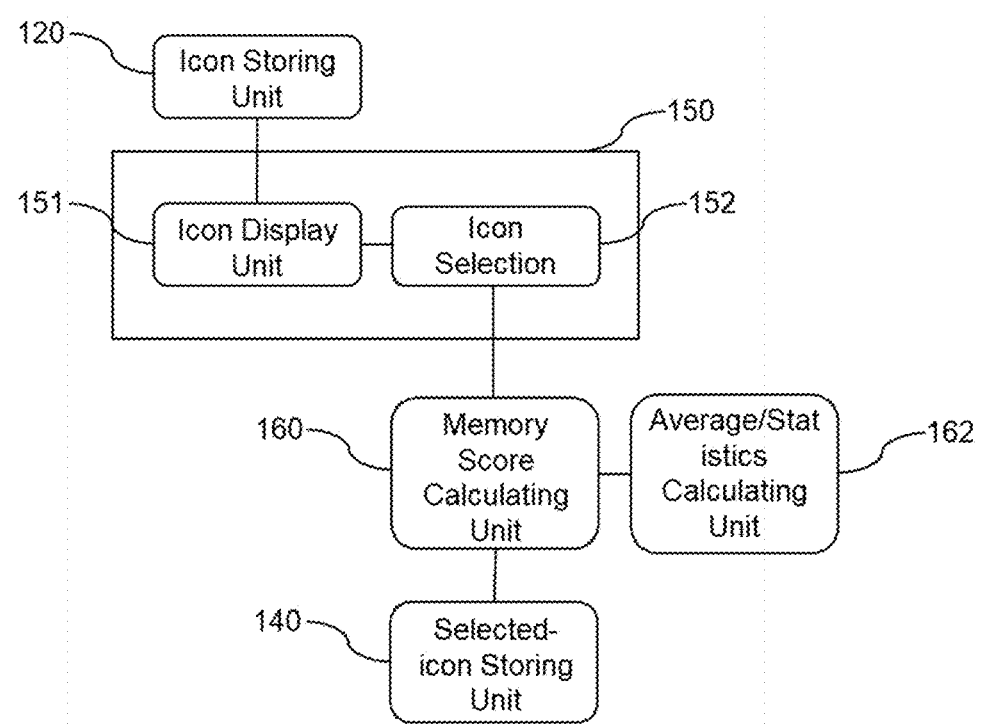
FIG. 3 is a functional block diagram of an activity retrieval test screen providing unit of the apparatus for enhancing memory shown in FIG. 1.

FIG. 3 is a functional block diagram of the activity retrieval test screen providing unit 150 according to some embodiments of the present invention.

In some embodiments of the present invention, the activity retrieval test screen providing unit 150 includes an icon display unit 151 for displaying multiple icons including the first icons and multiple icons including the second icons by a set number of icons, respectively.

In some embodiments of the present invention, as shown in FIG. 3, the apparatus 100 further includes an average/statistics calculating unit 162 for calculating an average value of memory scores of the specific group to which the user belongs and statistics of memory scores of the specific group or an entire group based on the memory score calculated by the memory score calculating unit 160.

Figure 4:
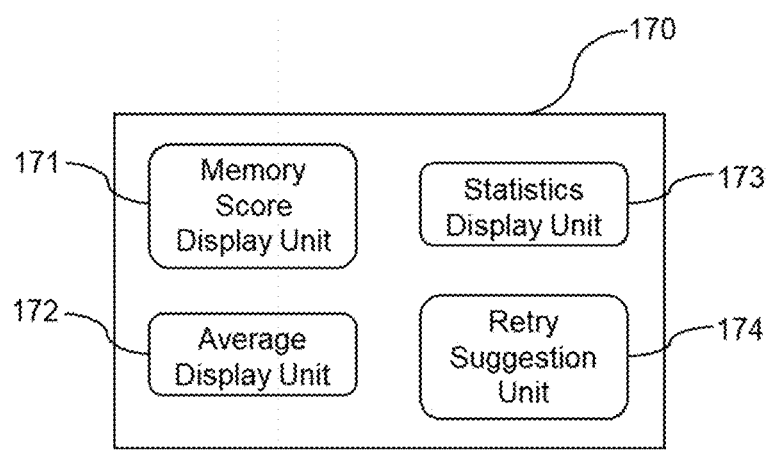
FIG. 4 is a functional block diagram of a feedback screen providing unit of the apparatus for enhancing memory shown in FIG. 1.

FIG. 4 is a functional block diagram of the feedback screen providing unit 170 according to some embodiments of the present invention.

In some embodiments of the present invention, the feedback screen providing unit 170 includes a memory score display unit 171 for displaying the memory score calculated by the memory score calculating unit 160, an average display unit 172 for displaying the average value of memory scores of the specific group, and a statistics display unit 173 for displaying statistics of memory scores of the specific group or an entire group.

In some embodiments of the present invention, the feedback screen providing unit 170 further includes a retry suggesting unit 174 which suggests the user to retry the activity retrieval test. The retry suggesting unit 174 may provide a retry screen when, for example, the memory score is equal to or less than a predetermined value. The user may retry the test through the retry suggesting unit 174 when the user's memory score is not good, or the test needs to be performed once again.

In some embodiments of the present invention, the icon display unit 151 displays the multiple icons including the first icons and the multiple icons including the second icons by different numbers of icons for respective steps of the activity retrieval test performed through the activity retrieval test screen.

For example, the first step of the test retrieves and arranges, among the nine choices of icons, the activity icons that the user had input (step selected from the input screen) in chronological order. The second step of the test retrieves and arranges, among the 20 choices of icons, the activity icons that the user had input (step selected from the input screen) in chronological order.

In addition to displaying the multiple icons including the first icons and the multiple icons including the second icons by different numbers of icons for the respective steps of the activity retrieval test, the icon display unit 151 according to some embodiments may be configured to render the icons covered with a specific figure so that the user may click on the icon positions to open and memorize the icons at the corresponding positions, and then input the icons following their order of arrangement.

In some embodiments of the present invention, the icon display unit 151 displays multiple icons including the first icons and multiple icons including the second icons in predetermined patterns.

In some embodiments of the present invention, the icon display unit 151 displays a plurality of icons including the first icons and a plurality of icons including the second icons by set numbers of icons in predetermined patterns, respectively.

Figure 5:
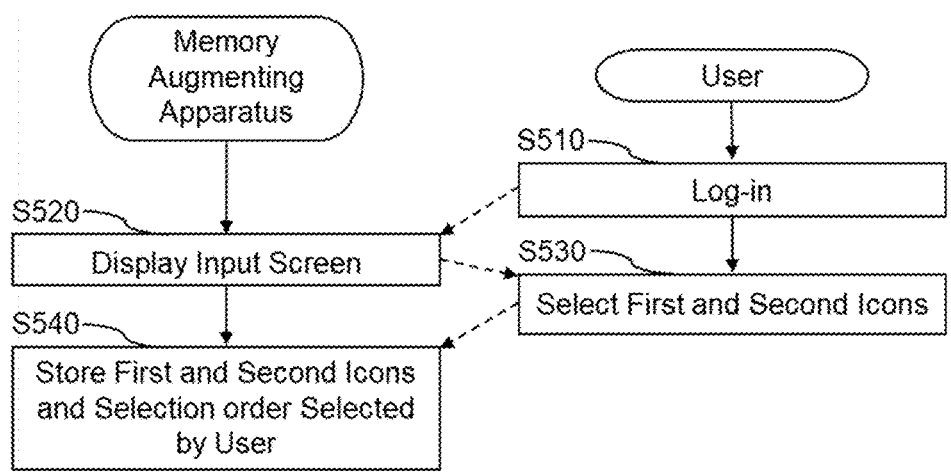
FIG. 5 is a flowchart of an operation of the input screen providing unit according to some embodiments of the present invention.
Figure 6:
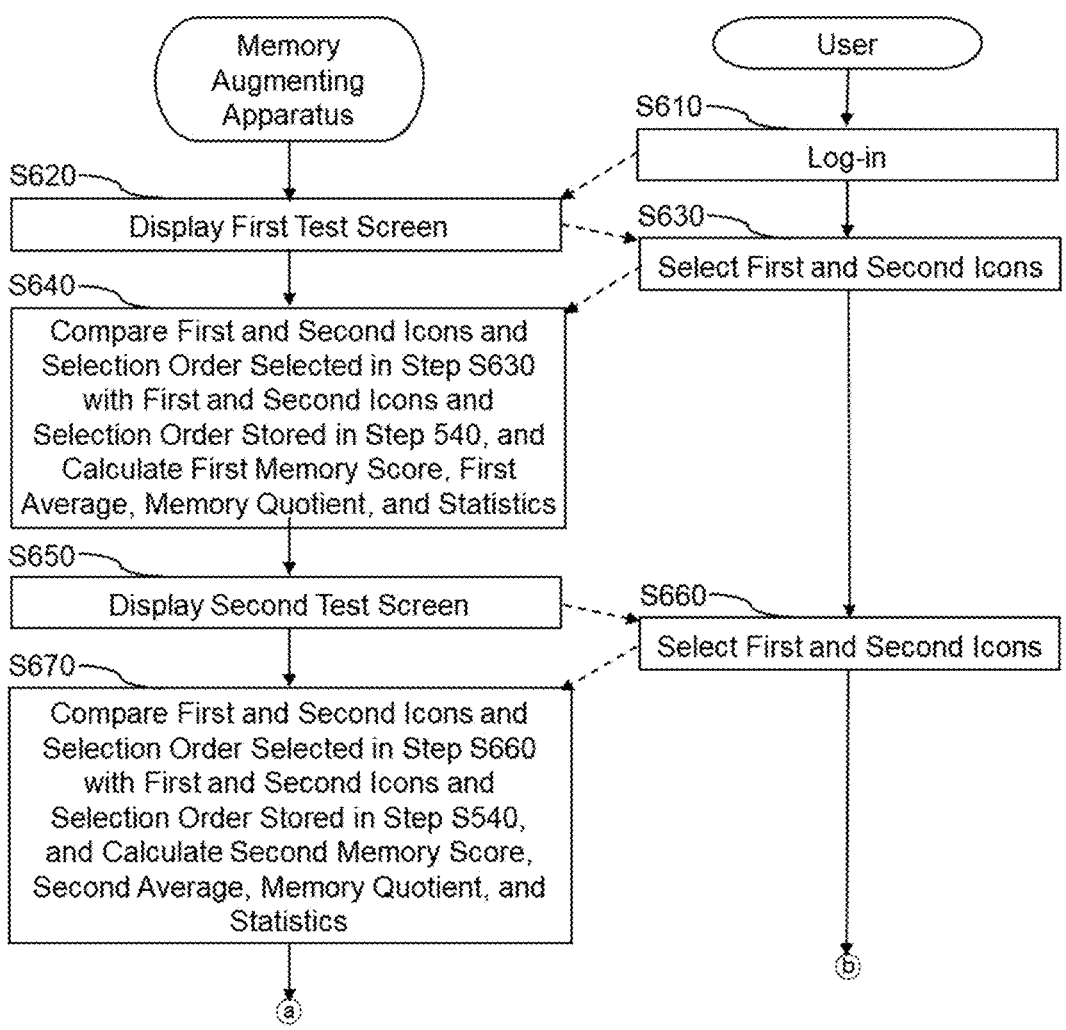
FIG. 6 is a flowchart of an operation of the activity retrieval test screen providing unit according to some embodiments of the present invention.
Figure 7:
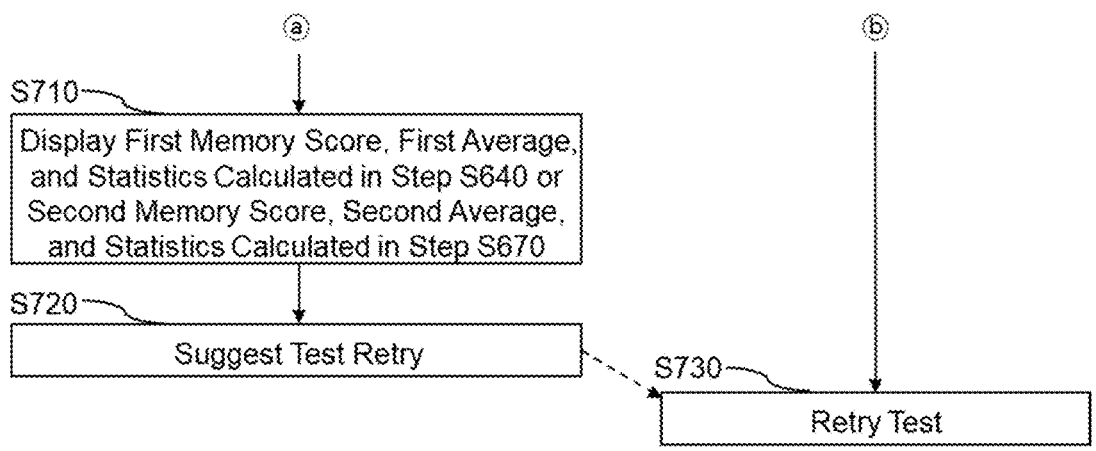
FIG. 7 is a flowchart of an operation of the feedback screen providing unit according to some embodiments of the present invention.

FIG. 5 is a flowchart of an operation of the input screen providing unit 130 according to some embodiments of the present invention. FIG. 6 is a flowchart of an operation of the activity retrieval test screen providing unit 150 according to some embodiments. FIG. 7 is a flowchart of an operation of the feedback screen providing unit 170 according to some embodiments.

Some embodiments of the present invention provides a method of enhancing memory including performing a login screen providing process of providing a login screen (Step S510), an input screen providing process of providing a user who logged in through the login screen with an input screen for allowing the user to select at least one or more first icons and at least one or more second icons corresponding to the first icons from among a plurality of first icons and a plurality of second icons which are stored in advance (Step S520), performing a selected-icon storing process, in response to when the user selects the first icons and the second icons through the input screen (Step S530), for storing the selected first icons and the selected second icons (Step S540). The method of enhancing memory further includes performing an activity retrieval teat screen providing process, in response to when the user logs in through the login screen one or more days after the user selected the first icons and the second icons through the input screen (Step S610), for providing a display of multiple icons including the first icons that had been selected through the input screen and multiple icons including the second icons that had been selected through the input screen, thereby providing an activity retrieval test screen for prompting the user to select, from among the display of multiple icons, the first icons and the second icons that had been selected through the input screen following a same order in which the first icons and the second icons had been selected by the user one or more days earlier (Step S620), a first memory score calculating process, in response to when the user selects, from among the display of multiple icons, the first icons and the second icons through the activity retrieval test screen (Step S630), for comparing the first icons and the second icons that are currently selected respectively with the first icons and the second icons that had been selected and stored by the selected-icon storing process, and thereby calculating a memory score of the user based on a result of the comparing (Step S640), and a feedback screen providing process of providing a feedback screen for displaying the memory score calculated by the first memory score calculating process (Step S710).

The method of enhancing memory according to some embodiments of the present invention is implemented in an app (e.g., within a smartphone) through modules that perform their respective functions within a processor (CPU).

In some embodiments of the present invention, the first icons are those representing such activities as meeting, sports, movie viewing, business, etc., and the second icons are those indicate satisfactions, achievements, or moods (hereinafter commonly referred to as satisfaction level) for the respective activities.

In some embodiments of the present invention, the first icons and the second icons include generic icons, emoticons, and images.

Using images for the first and second icons may be more helpful for a user with memory deficit to retrieve the correct memory from the damaged memory.

The input screen providing process S520 provides an input screen for allowing the user after logged in through the login screen to make a selection of at least one first icon among the plurality of first icons stored in advance, and another selection of at least one second icon corresponding to the first icon having been selected, from among the plurality of second icons.

In some embodiments of the present invention, the user selects a first icon corresponding to his/her activity, and then selects a satisfaction level with that activity, for example, from five stepwise levels. The satisfaction levels are not limited to five steps but may be set to less or more as needed.

The selected-icon storing process S540 is responsive to when the user makes the selections of the first and second icons through the input screen for storing the selected first and second icons. At this time, the user may input a simple memo along with the selections of the first and second icons, and the selected-icon storing process S540 stores the memo inputted together with the selected first and second icons at the time of inputting the memo.

In some embodiments of the present invention, instead of or together with the memo, images (photos) may be saved. Considering the contemporary sensitivity of people, using an image taken by the user directly or an image related to each activity may be more effective than using a text-based memo.

The activity retrieval test screen providing process S620 is responsive to the user's logging in through the login screen one or more days later than the previous selection of the first and second icons through the input screen, for providing a display of multiple icons that include the first icons and multiple icons that include the second icons, thereby providing an activity retrieval test screen (first test screen) for administering the activity retrieval test which prompts the user to select, from among the displayed multiple icons, the first and second icons following that same order as in the previous selection thereof made through the input screen one or more days earlier.

In some embodiments of the present invention, the one or more days of intermission arranged from the previous selection of the first and second icons before carrying out the subsequent selection thereof allows the user to have the time for solidifying the memory through sleeping on it.

In this case, where it was before 12:00 when the user selected the first and second icons through the input screen, the activity retrieval test screen is displayed when the user logs in again on the next day after 4:00 am, for example. The key here is to take a sleep for a predetermined time (e.g., at least four hours) after selecting the first and second icons through the input screen, so the icon selection of the day is considered to encompass the next day's selection session if the earlier selection includes a predetermined time of nap, for example, a predetermined time elapsed depending on the time zone assumably involving a several hours sleep at dawn after making the icon selection at around 1:00 am.

In other words, the next day as used in the present specification means to take a sleep for a predetermined time after selecting the first and second icons through the input screen.

The method of enhancing memory according to some embodiments of the invention improves memory by activating a wide area of the brain through a kind of diary writing and a diary-based memory training program.

According to cognitive neuroscience theories, retrieving memories often leads to better memory. One method of retrieving information is testing. Checking whether one's own memories are right or wrong can even improve meta memory. The activity retrieval test according to some embodiments of the present invention is designed to test the memory of the user's experience (activity) and feelings (Step Satisfaction) simply and quickly.

The first memory score calculating process S640 is responsive to when the user selects through the activity retrieval test screen, the first and second icons from the plurality of icons displayed thereon (Step S630), for comparing the selected first and second icons respectively with the stored first and second icons having been selected on the input screen, and thereby calculating the memory score of the user, specifically a first memory score, a first average, a memory quotient, and statistics of memory scores based on the comparison result.

In other words, the first and second icons selected on the input screen are to indicate the activities performed by the user on the corresponding day and the satisfaction levels of the respective activities, while the selected first and second icons through the activity retrieval test screen are from recalling the previous selection of as well as the order of selection of the first and second icons made on the previous day or one or more days earlier, and therefore the consistency between the stored icons and the selected icons proves a good memory of the user who is then entitled to a high memory score. In concert with the next day as defined above, the previous day as used herein is not simply reckoned to 12 o'clock at midnight but includes a predetermined time before a predetermined sleep that the user had.

The feedback screen providing process S710 provides a feedback screen for displaying the memory score calculated by the memory score calculating process S640.

In some embodiments of the present invention, the method of enhancing memory includes a process responsive to when the user selects multiple first icons and their corresponding multiple second icons, for storing those multiple first icons and their corresponding multiple second icons and the order of selection of the respective icons. The memory score calculating process S640 is responsive to when the user selects through the activity retrieval test screen, the multiple first icons and their corresponding multiple second icons from among the plurality of icons displayed thereon, for comparing the selected multiple first icons and their corresponding multiple second icons and the order of selection of the respective icons with the previously selected multiple first icons and their corresponding multiple second icons having been selected through the input screen and that order of selection of the respective icons, and thereby calculating the memory score of the user based on the comparison result.

In some embodiments of the present invention, the method of enhancing memory further includes a retry suggestion process S720 of suggesting the user to retry the activity retrieval test. The user may retry the test through the retry suggestion process S720 when the user's memory score is not good, or the test needs to be performed once again.

In some embodiments of the present invention, the method of enhancing memory displays the plurality of icons including the first icons and the plurality of icons including the second icons by different numbers of icons for the respective steps of the activity retrieval test (Step S730).

For example, the first step S620 of the test retrieves and arranges, among the nine choices of icons, the activity icons that the user had input (step selected from the input screen) in chronological order. The second step S650 of the test retrieves and arranges, among the 20 choices of icons, the activity icons that the user had input (step selected from the input screen) in chronological order.

A second memory score calculating process S670 is provided to compare, when the user selects through the activity retrieval test screen, the first and second icons from among the plurality of icons displayed thereon (Step S660), the selected first and second icons respectively with the first and second icons that had been selected on the input screen, thereby calculating the memory score of the user, specifically a second memory score, a second average, a memory quotient, and statistics of memory scores based on the comparison result. The feedback screen providing process S710 provides a feedback screen for displaying the second memory score, second average, memory quotient, and statistics of memory scores calculated by the second memory score calculating process S670.

In addition to displaying the plurality of icons including the first icons and the plurality of icons including the second icons by different numbers of icons for the respective steps of the activity retrieval test, the method of enhancing memory according to some embodiments may be arranged to cover icons in the form of a specific figure so that the user may click on the icon position to open and memorize the icon at the corresponding position, and then input the icons following their order of arrangement.

In some embodiments of the present invention, the method of enhancing memory includes displaying multiple icons including the first icons and multiple icons including the second icons in predetermined patterns.

In some embodiments of the present invention, the method of enhancing memory includes displaying multiple icons including the first icons and multiple icons including the second icons by set numbers of icons in predetermined patterns, respectively.

The aforementioned various methods according to some embodiments of the present invention may be implemented in the form of a program readable by various computer means and recorded in a computer-readable recording medium. In some embodiments of the present invention, the recording medium may include program instructions, data files, data structures, and the like, alone or in combination.

Program instructions to be recorded on the recording medium may be those specially designed and constructed for the present invention or known and available to those skilled in the art of computer software.

For example, the recording medium includes magnetic media such as a hard disk, a floppy disk and a magnetic tape, optical media such as a CD-ROM and a DVD, magneto-optical media such as a floptical disk, and hardware devices such as ROM, RAM, flash memory, and the like, which are specially configured to store and execute program instructions.

Examples of program instructions may include machine language such as those produced by a compiler, as well as high-level language that may be executed by a computer by using an interpreter or the like. Such hardware devices may be configured to operate as one or more software modules, and vice versa, to perform the operations of the present invention.

Figure 8:
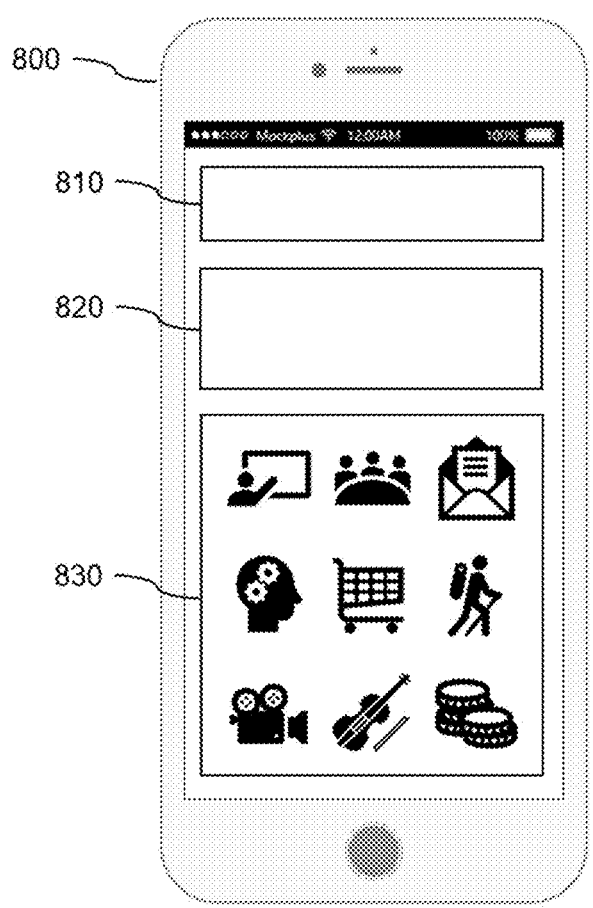
FIGS. 8 to 10 are schematic diagrams illustrating examples of input screens provided by the input screen providing unit according to some embodiments of the present invention.
Figure 9:
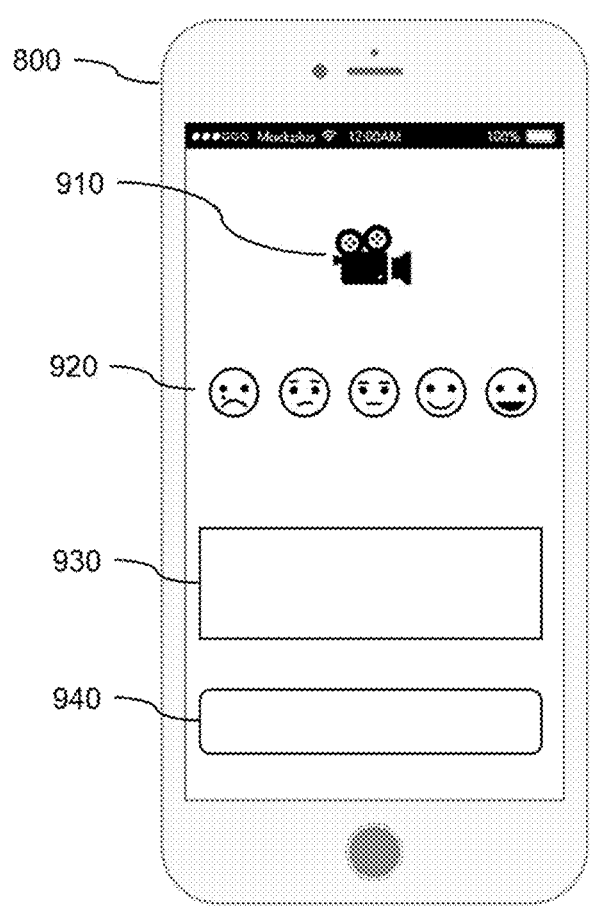
Figure 10:
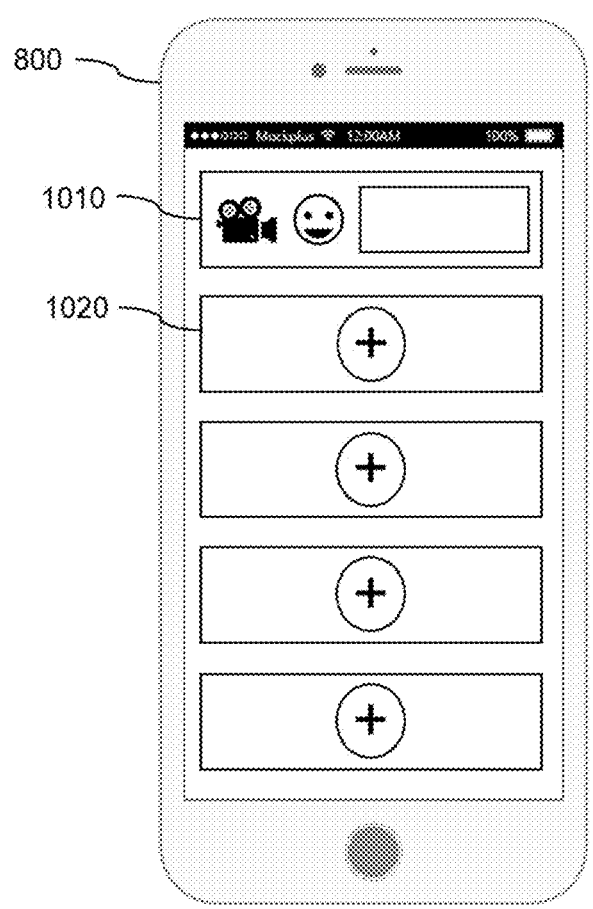
Figure 11:
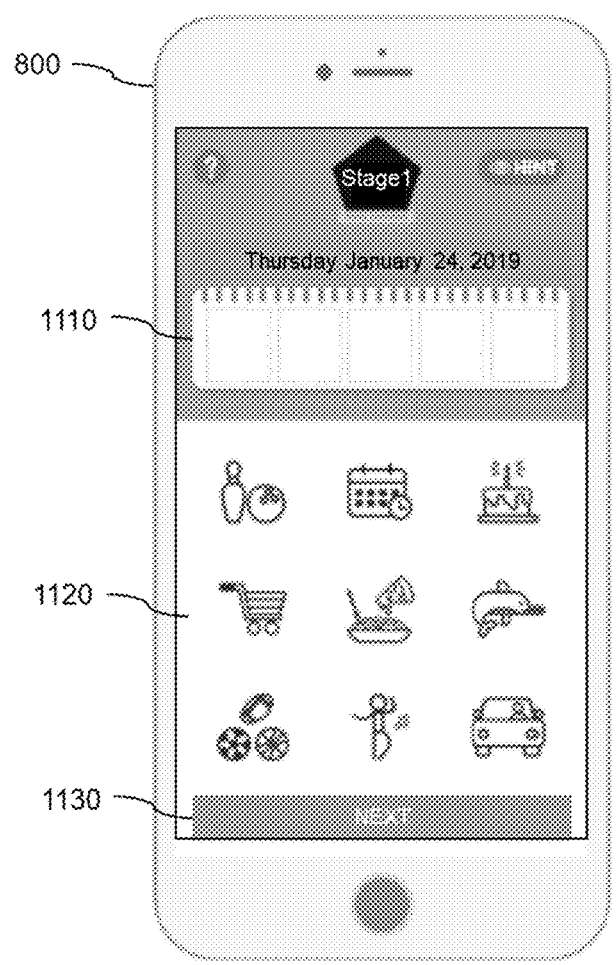
FIGS. 11 to 13 are schematic diagrams illustrating examples of activity retrieval test screens provided by the activity retrieval test screen providing unit according to some embodiments of the present invention.
Figure 12:
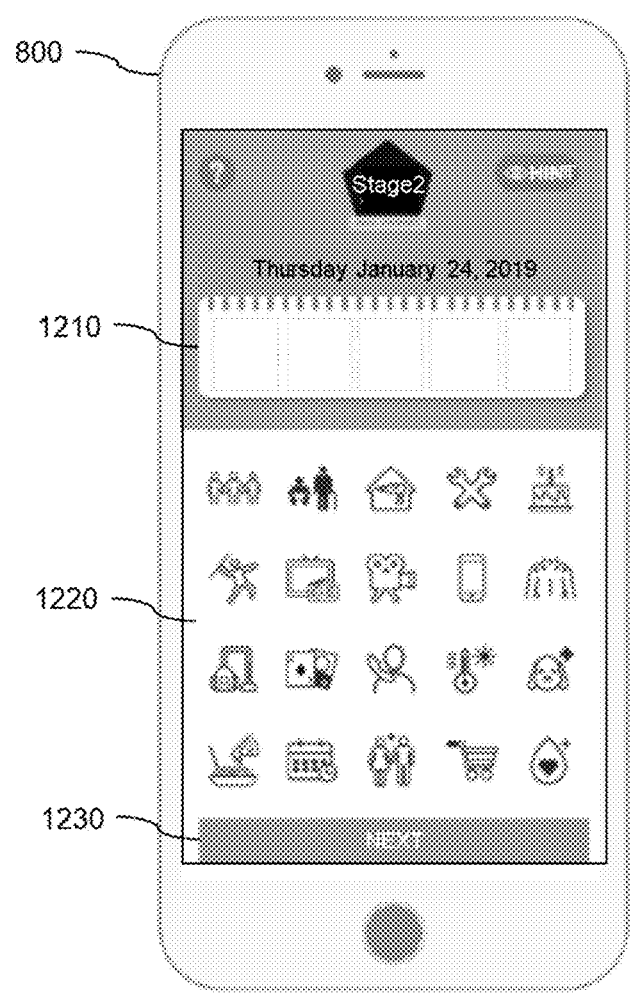
Figure 13:
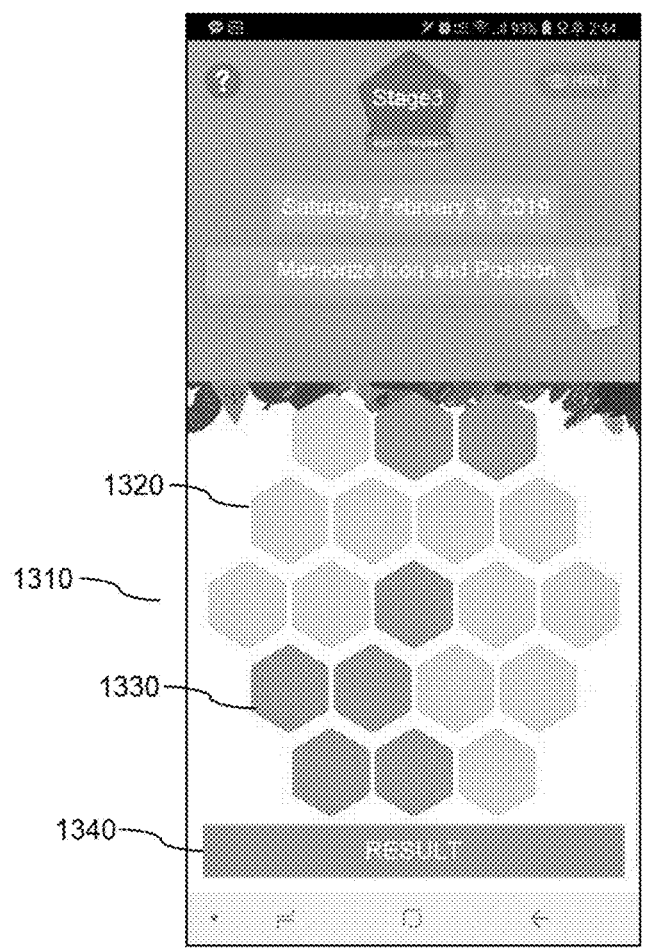
Figure 14:
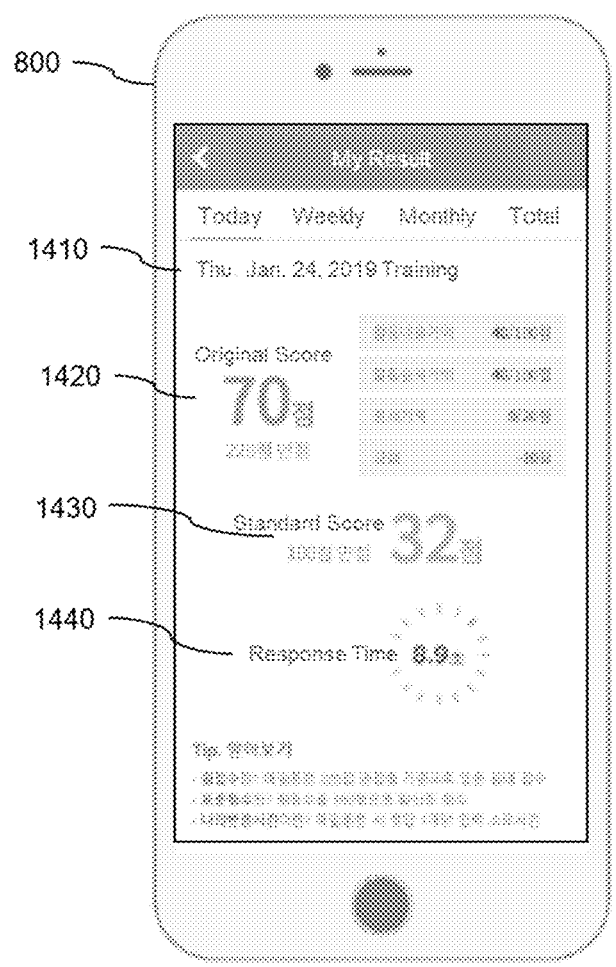
FIG. 14 is a schematic diagram illustrating an example of a feedback screen provided by the feedback screen providing unit according to some embodiments of the present invention.

FIGS. 8 to 10 are schematic diagrams illustrating examples of the input screens provided by the input screen providing unit 130 according to some embodiments of the present invention. FIGS. 11 to 13 are schematic diagrams illustrating examples of the activity retrieval test screens provided by the activity retrieval test screen providing unit 150 according to some embodiments. FIG. 14 is a schematic diagram illustrating an example of the feedback screen provided by the feedback screen providing unit 170 according to some embodiments.

As shown in FIG. 8, the input screen provided by the input screen providing unit of the apparatus 100 according to some embodiments may be provided as, for example, an app of a portable terminal 800 such as a smart phone, and it may be composed of a title area 810, a text area 820, and an icon area 830.

The title area 810 indicates a title of a screen displayed, for example, diary writing, activities, and the like.

The text area 820 may represent the icon area 830 in a text format, and it may allow a user to input choices of activities.

The icon area 830 displays a predetermined number of icons among a plurality of icons stored in the icon storing unit 120. Although a total of nine icons are displayed in the example shown in FIG. 8, more icons may be displayed, a scroll function may be supported, or an icon may be displayed over a plurality of pages as needed.

FIG. 9 illustrates a subsequent screen to the input screen of FIG. 8 on which the user had selected an icon in the icon area 830. The subsequent screen allows the user to select a satisfaction level for the selected icon. In this example, the user had selected a movie viewing icon 910 in the icon area 830 shown in FIG. 8, and subsequently selects the corresponding icon from five stepwise satisfaction level icons 920.

The subsequent screen has a memo area 930 in which a simple memo or hint for the selected icons 910 and 920 can be input. When a satisfaction level icon is selected or a 'next' area 940 is selected in the screen shown in FIG. 9, the screen advances to the extra screen shown in FIG. 10.

The extra screen shown in FIG. 10 has an input area 1010 which displays the icons 910 and 920 entered in FIGS. 8 and 9 and notes or hints about the relevant activities, and extra areas 1020 with a plus sign to be touched or clicked to input activities in succession.

FIG. 11 illustrates an example of the step-one activity retrieval test screen according to some embodiments of the present invention. When the user selects, from among multiple icons displayed on an icon area 1120, the icons in the user's memory by recalling the previous input of icons entered through the input screen on the previous day or one or more days earlier, the selected icons are input in an input area 1110 one by one. Upon completion of the inputs, a touch or click of a 'next' area 1130 displays whether the selected icons match the previous icons input through the input screen, or it displays a screen for prompting or allowing to recall and select the satisfaction levels of the respective selected icons. Alternatively, a screen may be displayed for allowing the user to recall and select the activity icon corresponding to each satisfaction level.

The step-one activity retrieval test screen shown in FIG. 11 displays nine total icons, and it allows the user to recall and select the previous icon inputs made through the input screen on the previous day or before.

FIG. 12 illustrates an example of the step-two activity retrieval test screen according to some embodiments of the present invention. Unlike the step-one activity retrieval test screen shown in FIG. 11, the step-two activity retrieval test screen displays 20 total icons for allowing the user to recall and select the icons that were entered through the input screen on the previous day or before.

FIG. 13 illustrates an example of the step-three activity retrieval test screen according to some embodiments of the present invention. The step-three activity retrieval test screen has an icon area 1310 of a specific pattern divided into first colored areas 1320 to which no icon is allocated and second colored areas 1330 to which icons are allocated. Then, the second colored areas 1330 are assigned a plurality of icons which includes icons the user had input on the input screen the previous day or before.

In this case, the user cannot know which icon is assigned to which position on the screen shown in FIG. 13, and the user touches or clicks on the respective icon allocation positions of the area 1330 and thereby peaks and memorizes the icons by their positions. In this way, a step-three activity retrieval test according to some embodiments of the present invention further employs hidden icons in the memory challenge, thereby enhancing the memory capacity over more complex matters to remember.

In addition, some embodiments of the present invention can further enhance memory for more complex matters to memorize by modifying the specifics in FIG. 13, such as the pattern shown, the number of areas to which icons are assigned, and the colors of the respective positions of the areas to which the icons are assigned, or by combining these factors.

FIG. 14 illustrates an example of the feedback screen according to some embodiments of the present invention, which includes a test date 1410, an absolute score 1420, a relative score 1430 obtained by converting an absolute score on a maximum of 100 points, a reaction time 1440, and the like. The content displayed on the feedback screen is not limited to this, and the statistics of a specific group to which the user belongs may be displayed through a scroll function or over a plurality of pages.

As described above, some embodiments of the present invention can provide an apparatus for enhancing memory through autobiographical memory recall.

In addition, some embodiments of the present invention can provide an apparatus for enhancing memory capable of improving metacognitive function and memory through testing, feedback and retry.

The present disclosure should not be limited to these embodiments but various changes and modifications are made by one ordinarily skilled in the art within the subject matter, the spirit and scope of the present disclosure as hereinafter claimed. Specific terms used in this disclosure and drawings are used for illustrative purposes and not to be considered as limitations of the present disclosure. Exemplary embodiments of the present disclosure have been described for the sake of brevity and clarity. Accordingly, one of ordinary skill would understand the scope of the claimed invention is not to be limited by the explicitly described above embodiments but by the claims and equivalents thereof.

What is claimed is:

1. An apparatus for enhancing memory, the apparatus comprising a processor, wherein, the processor includes
- a login screen providing unit configured to provide a login screen,
- an icon storing unit configured to store a plurality of first icons each representing an activity and a plurality of second icons each representing a degree of satisfaction for the activity in a memory,
- an input screen providing unit configured to provide an input screen for allowing a user after logging in through the login screen to select at least one first icon from the plurality of first icons and at least one second icon corresponding to the at least one first icon from the plurality of second icons,
- a selected-icon storing unit configured to, upon the user selecting the at least one first icon and the at least one second icon through the input screen, store the at least one first icon and the at least one second icon in the memory,
- an activity retrieval test screen providing unit configured to, upon the user logging in through the login screen next day or later of a day when the user selected the at least one first icon and the at least one second icon through the input screen, provide an activity retrieval test screen to display a plurality of third icons including the at least one first icon selected through the input screen and a plurality of fourth icons including the at least one second icon selected through the input screen and to prompt the user to select the at least one first icon and the at least one second icon selected through the input screen in order from the plurality of third icons and the plurality of fourth icons, respectively,
- a memory score calculating unit configured to, upon the user selecting the at least one first icon and the at least one second icon from the plurality of third icons and the plurality of fourth icons, respectively, through the activity retrieval test screen, compare the at least one first icon and the at least one second icon that are currently selected with the at least one first icon and the at least one second icon stored in the memory by the selected-icon storing unit and to calculate a memory score of the user based on a result of comparison, and
- a feedback screen providing unit configured to provide a feedback screen for displaying the memory score calculated by the memory score calculating unit.

2. The apparatus according to claim 1, wherein
the selected-icon storing unit is configured to, upon the user selecting a plurality of first icons and a plurality of second icons corresponding to the plurality of first icons selected, store a plurality of selected first icons and a plurality of selected second icons together with an order of selecting the plurality of first icons and the plurality of second icons in the memory, and
the memory score calculating unit is configured to, upon the user selecting a plurality of first icons and a plurality of second icons from the plurality of third icons and the plurality of fourth icons, respectively, through the activity retrieval test screen, compare the plurality of first icons and the plurality of second icons that are currently selected and the order of selecting the plurality of first icons and the plurality of second icons with the plurality of selected first icons and the plurality of selected second icons and the order of selecting the plurality of first icons and the plurality of second icons stored in memory by the selected-icon storing unit and to calculate the memory score of the user based on a result of comparison.

3. The apparatus according to claim 1, wherein the input screen providing unit includes an icon display unit configured to display at least a portion of the plurality of first icons and a portion of the plurality of second icons stored in the memory by the icon storing unit.

4. The apparatus according to claim 1, wherein the activity retrieval test screen providing unit includes an icon display unit configured to display a preset number of third icons including the at least one first icon and a preset number of fourth icons including the at least one second icon.

5. The apparatus according to claim 3, wherein the processor further includes an average/statistics calculating unit configured to calculate an average value of memory scores of a specific group to which the user belongs and statistics of memory scores of the specific group or an entire group to which the specific group belongs based on the memory score calculated by the memory score calculating unit.

6. The apparatus according to claim 5, wherein the feedback screen providing unit includes
- a memory score display unit configured to display the memory score calculated by the memory score calculating unit,
- an average-value display unit configured to display the average value of memory scores of the specific group, and
- a statistics display unit configured to display the statistics of memory scores of the specific group or the entire group.

7. The apparatus according to claim 6, wherein the feedback screen providing unit further includes a retry suggesting unit configured to suggest the user to retry an activity retrieval test performed through the activity retrieval test screen.

8. The apparatus according to claim 4, wherein the icon display unit is configured to display the plurality of third icons including the at least one first icon and the plurality of fourth icons including the at least one second icon by different numbers for different levels of activity retrieval test performed through the activity retrieval test screen.

9. The apparatus according to claim 4, wherein the icon display unit is configured to display the plurality of third icons including the at least one first icon and the plurality of fourth icons including the at least one second icon in predetermined patterns, respectively.

10. The apparatus according to claim 4, wherein the icon display unit is configured to display the preset number of third icons including the at least one first icon and the preset number of fourth icons including the at least one second icon in predetermined patterns, respectively.

11. A method of enhancing memory by a processor, the method comprising:
providing a login screen;
storing a plurality of first icons each representing an activity and a plurality of second icons each representing a degree of satisfaction for the activity in a memory;
providing an input screen for allowing a user after logging in through the login screen to select at least one first icon from the plurality of first icons and at least one second icon corresponding to the at least one first icon from the plurality of second icons;
storing, upon the user selecting the at least one first icon and the at least one second icon through the input screen, the at least one first icon and the at least one second icon in the memory;

providing, upon the user logging in through the login screen next day or later of a day when the user selected the at least one first icon and the at least one second icon through the input screen, an activity retrieval test screen to display a plurality of third icons including the at least one first icon selected through the input screen and a plurality of fourth icons including the at least one second icon selected through the input screen and to prompt the user to select the at least one first icon and the at least one second icon selected through the input screen in order from the plurality of third icons and the plurality of fourth icons, respectively;

comparing, upon the user selecting the at least one first icon and the at least one second icon from the plurality of third icons and the plurality of fourth icons, respectively, through the activity retrieval test screen, the at least one first icon and the at least one second icon that are currently selected with the at least one first icon and the at least one second icon stored in the memory;

calculating a memory score of the user based on a result of comparison; and providing a feedback screen for displaying the memory score calculated at the calculating.

12. A non-transitory computer readable medium storing a computer program including computer-executable instructions for causing, when executed in a processor, the processor to perform the method according to claim 11.

\* \* \* \* \*